United States Patent
Miller et al.

(10) Patent No.: US 7,822,710 B1
(45) Date of Patent: Oct. 26, 2010

(54) SYSTEM AND METHOD FOR DATA COLLECTION

(75) Inventors: Clint Miller, Austin, TX (US); David K. Williams, Austin, TX (US); Matthew F. Dennis, Austin, TX (US); Anthony Kitchin, Austin, TX (US)

(73) Assignee: Troux Technologies, Austin, TX (US)

( * ) Notice: Subject to any disclaimer, the term of this patent is extended or adjusted under 35 U.S.C. 154(b) by 436 days.

(21) Appl. No.: 11/805,873

(22) Filed: May 24, 2007

Related U.S. Application Data

(60) Provisional application No. 60/808,182, filed on May 24, 2006.

(51) Int. Cl.
*G06F 17/00* (2006.01)

(52) U.S. Cl. ...................................... 707/620; 707/643

(58) Field of Classification Search ......... 707/100–102, 707/200–202, 609–624, 644–647, 678–682
See application file for complete search history.

(56) References Cited

U.S. PATENT DOCUMENTS

| | | | |
|---|---|---|---|
| 5,572,732 A | 11/1996 | Fant et al. | |
| 6,226,792 B1 | 5/2001 | Goiffon | |
| 6,442,557 B1 | 8/2002 | Buteau et al. | |
| 6,509,898 B2 | 1/2003 | Chi | |
| 6,529,909 B1 | 3/2003 | Boman-Amuah | |
| 6,611,838 B1 | 8/2003 | Ignat et al. | |
| 6,662,188 B1* | 12/2003 | Rasmussen et al. | 707/102 |
| 7,103,171 B1 | 9/2006 | Annadata et al. | |
| 7,124,180 B1* | 10/2006 | Ranous | 709/224 |
| 7,428,546 B2 | 9/2008 | Nori et al. | |
| 7,523,128 B1 | 4/2009 | Miller et al | |
| 7,558,790 B1 | 7/2009 | Miller et al. | |
| 7,664,712 B1 | 2/2010 | Duvall et al. | |
| 7,698,683 B1 | 4/2010 | Miller et al. | |
| 2003/0088551 A1 | 5/2003 | Tong | |
| 2003/0110253 A1 | 6/2003 | Anuszczyk | |
| 2003/0177481 A1 | 9/2003 | Amaru | |
| 2003/0187826 A1 | 10/2003 | Kennedy et al. | |
| 2003/0208367 A1 | 11/2003 | Aizenbud-Reshef | |
| 2003/0212640 A1 | 11/2003 | Andresen | |
| 2004/0002818 A1* | 1/2004 | Kulp et al. | 702/20 |
| 2004/0049509 A1 | 3/2004 | Keller | |
| 2004/0073655 A1 | 4/2004 | Kan | |
| 2004/0111513 A1 | 6/2004 | Shen | |

(Continued)

OTHER PUBLICATIONS

Muller, Robert, "Database Design for Smarties Using UML for Data Modeling", Morgan Kaufmann Publishers, 265 pages, 1999.

(Continued)

*Primary Examiner*—Wilson Lee
(74) *Attorney, Agent, or Firm*—Sprinkle IP Law Group

(57) ABSTRACT

Embodiments of the present invention provide methods and systems for extracting data from multiple sources and loading data into a central repository. One embodiment of a method of the present invention includes extracting a first set of data from one or more data sources, correlating the first set of data with a second set of data contained in a central repository, comparing the first set of data with the second set of data, determining a set of operations to be applied to the second set of data and applying the set of operations to the second set of data.

21 Claims, 6 Drawing Sheets

U.S. PATENT DOCUMENTS

| | | |
|---|---|---|
| 2004/0225791 A1 | 11/2004 | Keskar |
| 2004/0260706 A1 | 12/2004 | Anonsen et al. |
| 2005/0033762 A1 | 2/2005 | Kasravi |
| 2005/0138039 A1 | 6/2005 | Hagen |
| 2005/0203920 A1 | 9/2005 | Deng |
| 2006/0106796 A1 | 5/2006 | Venkataraman |
| 2006/0136437 A1 | 6/2006 | Yamasaki |
| 2006/0167927 A1 | 7/2006 | Edelstein |
| 2006/0195460 A1 | 8/2006 | Nori |
| 2006/0212487 A1* | 9/2006 | Kennis et al. ............... 707/200 |
| 2006/0277022 A1 | 12/2006 | Pulfer |
| 2006/0294148 A1* | 12/2006 | Brunet ....................... 707/200 |
| 2007/0192415 A1 | 8/2007 | Pak |
| 2007/0282916 A1 | 12/2007 | Albahari et al. |
| 2010/0169380 A1 | 7/2010 | Miller et al. |

OTHER PUBLICATIONS

Gomik, "UML Data Modeling Profile", 2002, Rational corp., TP162, pp. i-ii, 1-11.

CBOP et al., "A UML Profile for Enterprise Distributed Object Computing—Joint Final Submission—Component Collaboration Archicatures (CCA)", OMG Document No. ad/2001-08-19, http://enterprisecomponent.com/docs/EdocCCA.pdf, 169 pages.

Office Action mailed Mar. 1, 2010 in U.S. Appl. No. 11/095,323, 24 pages.

Office Action mailed Mar. 15, 2010 in U.S. Appl. No. 11/117,039, 31 pages.

Office Action issued U.S. Appl. No. 11/929,157, mailed Jun. 6, 2010, 13 pages.

Du et al., "XML structures for relational data," Web Info. Sys. Engineering, 2001. Proceedings of the Second Int'l Conf. on (0-7965-1393-X), Dec. 3-6, 2001, vol. 1; p. 151-160 download: http://ieeexplore.ieee.org/stamp/stamp.jsp?isnumber+21506&arnumber=996476&punumber=7824.

* cited by examiner

PRIOR ART

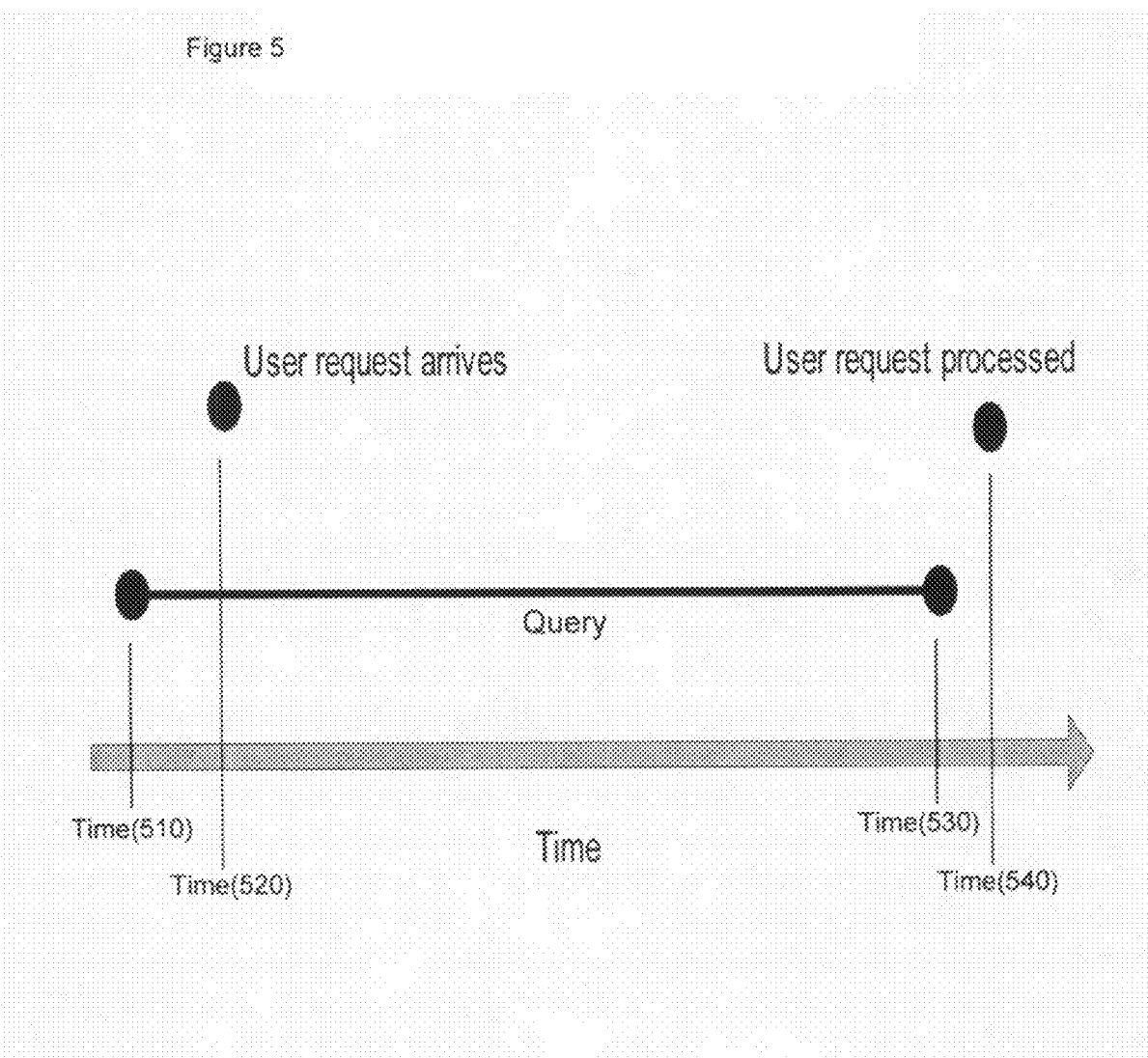

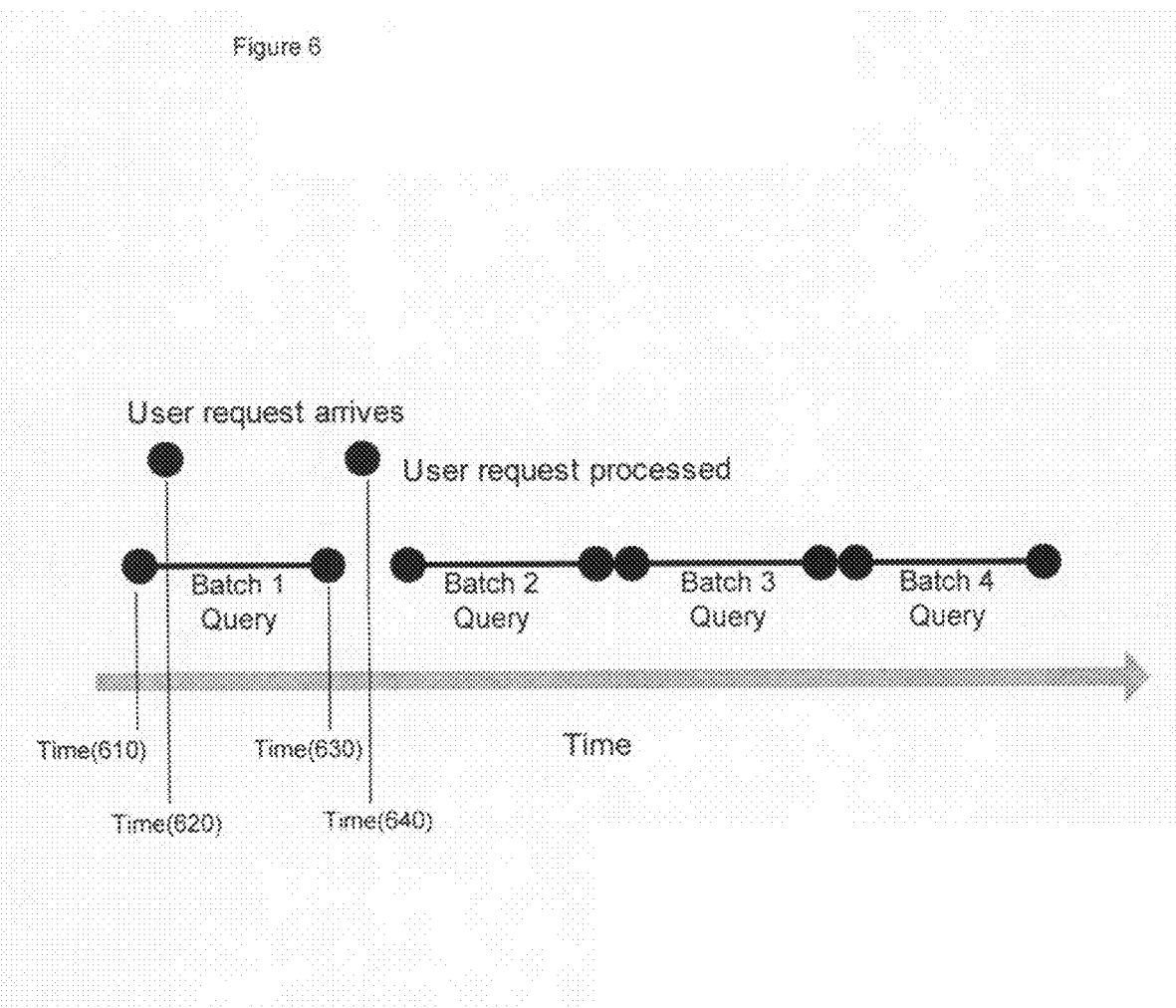

SYSTEM AND METHOD FOR DATA COLLECTION

RELATED APPLICATIONS

This application claims priority under 35 U.S.C. §119 to U.S. Provisional Patent Application No. 60/808,182, entitled "System and Method for Data Collection in an Information Technology Environment" by Miller, et al., filed on May 24, 2006. All applications cited within this paragraph are fully incorporated by reference.

TECHNICAL FIELD OF THE INVENTION

The present invention relates to systems and methods for collecting data from one or more data sources. More particularly the present invention relates to systems and methods of collecting data into a central repository. Even more particularly, the present invention regards systems and methods of extracting data from one or more data sources and loading data into a central repository.

BACKGROUND

Companies have a need to maintain and access information relevant to their business and assets. Often, such information is not centralized but instead exists in diverse data sources and locations, for example in Tivoli and SMS applications, in spreadsheets, in Visio diagrams, in modeling tools, etc. Much of the data in these various data sources is overlapping and frequently conflicting. Because data is stored in diverse data sources and locations, it may not be easily accessible. Thus, data may not be available to those who require it or the data may become increasingly obsolete because it is difficult to access and update.

A common solution to this problem is to compile data into a central database. An existing approach is to write custom code for each data source (spreadsheet, SMS, Tivoli, etc) that reads data from the data source and writes it into the central database. A system for extracting data from various sources according to the above prior art methodology is shown in system 100 of FIG. 1.

In system 100, data from database 110, spreadsheet 120 and other data source 130, such as a Tivoli application or a modeling tool, is extracted to centralized database 140 by custom code for database 115, custom code for spreadsheet 125 and custom code for other data source 135, respectively. There are multiple problems with this approach. First, it is expensive to write custom code for each type of data source and custom code may have to be developed for each type of data source from which data will extracted. Second, as is shown FIG. 1, this approach does not address the problems of overlapping data sources and redundant or conflicting data held in the same or different data sources as part of an integrated process involving all the data sources. Instead, any attempt to address these issues would have to be conducted piecemeal in each separate custom code. Because individual custom codes may not be cognizant of each other or of other data sources, such attempts might be incomplete or unfeasible. Thus, prior art methods may not have the capacity to resolve differences between overlapping data sources or conflicts between redundant or conflicting data.

Furthermore, different custom codes may extract data in different formats and store the data into the central database such that data from different extractors exists in different formats or is organized differently. In addition, because the process of extracting data to a central database can consume large amounts of computational resources, the process has the potential to prevent other processes, program or users from receiving computational resources adequate for their processing requirements, effectively limiting the use of the database or the computer system running the database.

SUMMARY

Using the present invention, data from multiple data sources can be extracted, transformed into a normalized form and loaded into a central data repository or database utilizing a set of processes and tools. Extraction of data from multiple data sources utilizing a set of processes and tools can be achieved by extracting and transforming data from one or more data sources in stages. One embodiment of the present invention includes extracting a set of data from one or more data sources. The extracted set of data can be correlated or compared with a set of data contained in a central repository. Based upon the correlation or comparison, a set of operations to be applied to the set of data contained in the central repository can be determined. The set of operations can be applied to the set of data contained in the central repository.

In further embodiments of the invention, the extracted set of data can be associated with a first set of precedences, the set of data contained in the central repository can be associated with a second set of precedences and the set of operations to be applied to the set of data contained in the central repository can be determined based on the first set of precedences, the second set of precedences and precedence rules. Embodiments of the invention can further include updating the second set of precedences based on the first set of precedences and the set of operations. The extracted set of data can be divided into a plurality of batches, allowing the extracted set of data to be processed in batches.

It may be easier to manage and analyze data in a central repository than it is to manage and analyze data stored in diverse data sources. By utilizing a set of processes and tools which can be configured or supplemented, data can be extracted from various data sources, normalized into a format and loaded into a central repository. A program containing a set of processes and tools can be used as a basis for extracting and processing data from multiple data sources. It may be less expensive both in cost and resources to configure or supplement a set of processes and tools than to custom-program extraction programs for each one of the various data sources. Furthermore, embodiments of the invention may have the advantage that substantially the same set of processes and tools can be applied to data extracted from one or more data sources. As a further advantage, data redundancies and conflicts between the various data sources may be resolved using the set of processes and tools.

Systems and methods of the present invention may also enable a central repository to be updated more efficiently and with greater speed. In embodiments of the invention, the determination of the data to be propagated into the data base is completed before the propagation of data into the central repository begins, reducing the amount of time that the central repository is in the process of being updated.

Furthermore, in embodiments of the invention, a process called batching, in which data is divided into batches, can be used to reduce the amount of data that may have to be processed before commands associated with other users or programs can be executed. The use of batching can help ensure users or programs receive adequate computational resources while the data to be propagated into the central repository is determined or data is being propagated into the central repository.

Systems and methods of the present invention can be implemented in computer programs and can include computer executable instructions contained on one or more computer readable storage mediums.

Components and processes of the present invention may be implemented on different computers and in different memories. Components and processes of the present invention may be implemented on the client-side or the server-side of a network having clients and servers or between the client-side and server-side. One or more versions of structured query language (SQL) or other query language can be used with embodiments of the present invention.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 5 is a diagrammatic representation of resource consumption in conjunction with one embodiment of the present invention; and FIG. 6 is a diagrammatic representation of resource consumption in conjunction with one embodiment of the present invention.

DETAILED DESCRIPTION

Preferred embodiments of the invention are illustrated in the FIGURES, like numerals being used to refer to like and corresponding parts of the various drawings.

Embodiments of the present invention provide a method and system for extracting, transforming and loading data held in various data sources according to a variety of formats into a central data repository such that data is in a normalized form. Specifically, embodiments of the present invention may extract data from various data sources and transform the data into a format corresponding to the central data repository. Additionally, through this extraction and transformation process, embodiments of the present invention may resolve data redundancies and conflicts between data from one or more of the data sources.

More particularly, embodiments of the present invention utilize a set of processes and tools through which data can be gathered into a central repository or database, overlapping data culled and conflicting data issues resolved, eliminating the need to write wholly custom applications in order to extract data held by each data source, thus reducing the overall cost of extracting data from multiple data sources.

Figure 1:
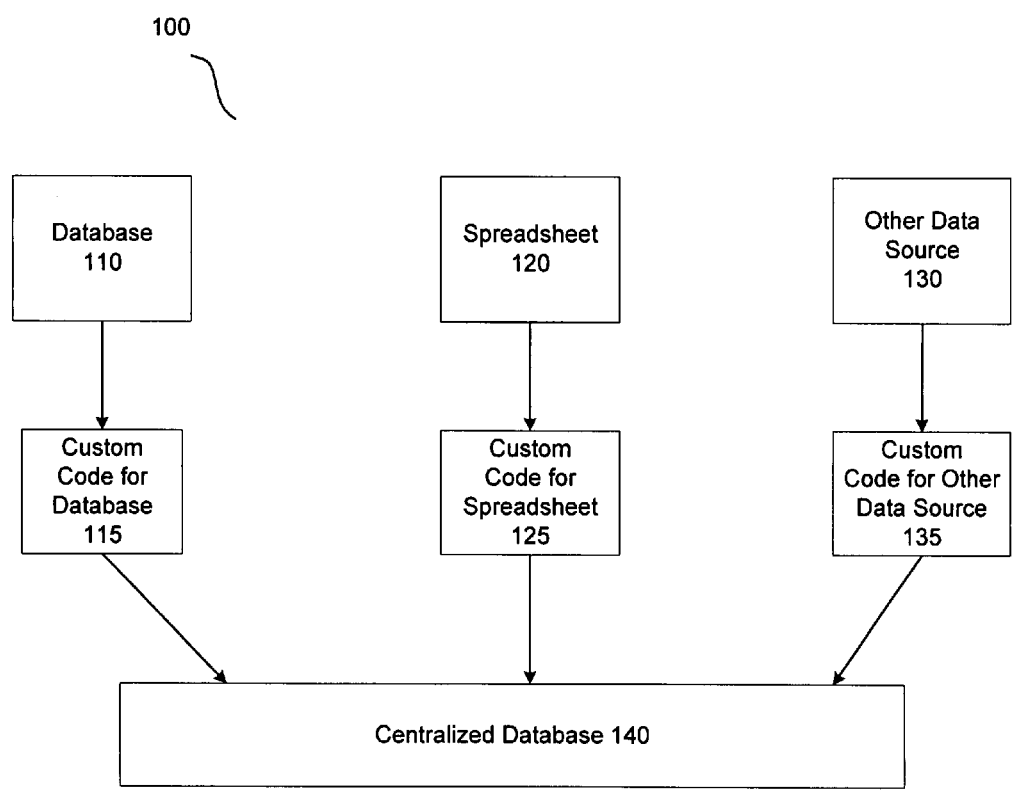
FIG. 1 is a diagrammatic representation of one embodiment of a prior art methodology for collecting data in a database.
Figure 2:
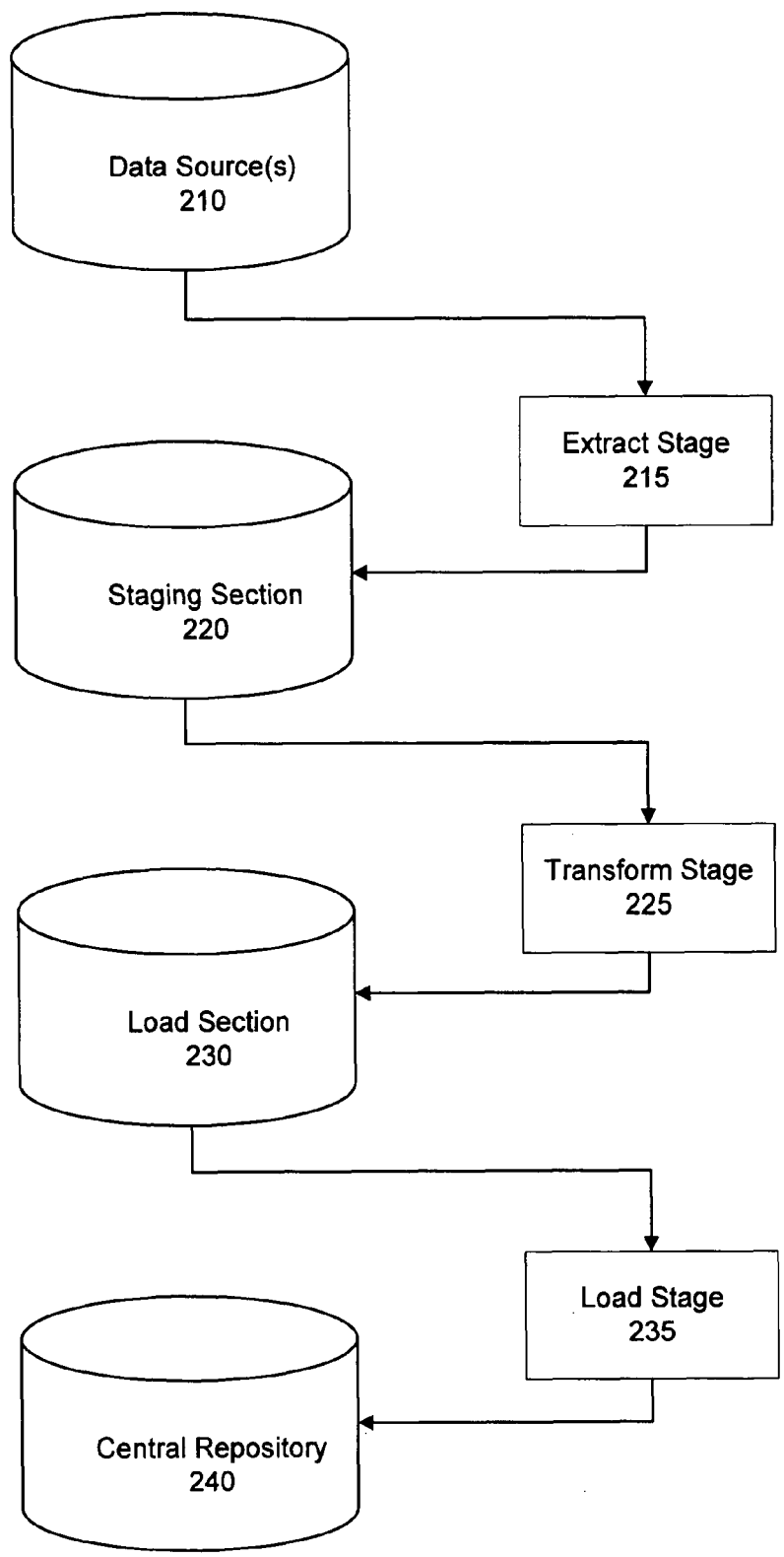
FIG. 2 is a diagrammatic representation of one embodiment of a methodology of the present invention.

FIG. 2 depicts a methodology of one embodiment of the invention. Data is processed in three stages: extract stage 215, transform stage 225 and load stage 235. At extract stage 215, data may be extracted from one or more data sources 210, normalized and developed into data structures. These data structures are stored in staging section 220. Staging section 220 may, for example, include temporary memory like RAM or more persistent memory such as a database or data repository which may or may not be a part of or associated with the central repository. At transform stage 225, data in staging section 220 is compared against data in central repository 240. Based on the comparison, it can be determined what operations may be applied to central repository 240 (e.g. what data needs to be created, deleted, or updated in central repository 240). In embodiments of the invention, at transform stage 225, the operations to be applied to central repository 240 can be recorded in load section 230 (which may be a part of or comprise storage similar to staging section 220). At load stage 235, changes are effected in central repository 240. In one embodiment, at load stage 235, the operations recorded in load section 230 are applied to central repository 240.

In one embodiment, central repository 240 is part of a database which may allow the representation of any logical or physical entity and the relationships (e.g. associations or dependencies) between these entities. In one embodiment, this may be done through the use of data formats. In one data format, components may be used to represent the entities while relationships may be used to represent the relationships between the entities. Components or relationships may be represented as data structures. Data structures may have a set of associated properties. The term property is intended to mean a characteristic associated with a component or a relationship. A property may have a name and a value associated with it, and components of the same type may have different values for the same property. The term type is intended to mean a category of a relationship or a component. All relationships or components of the same type will have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes. A system of types may be utilized with a generic data model to define a hierarchy of data structures for use with a particular environment. The data structures associated with a generic data model may be stored utilizing a table schema which does not change with the addition of new data structures or types of data structures. A query language may be utilized with a data model to search specific applications of the generic data model according to specific criteria. A database of this type may be referred to herein as the Troux database and is described in greater detail in U.S. patent application Ser. Nos. 10/802,304, entitled Method and System for a Generic Data Model, filed Mar. 17, 2004 and 10/803,133, entitled Method and System for Querying an Applied Data Model, filed Mar. 17, 2004, both of which are hereby incorporated by reference.

For ease of description, embodiments of the stages outlined above will be described below in greater detail in reference to the Troux database described above. However, it will be apparent that embodiments of the present invention may be utilized with other forms of repositories or databases.

Extract Stage

Figure 3:
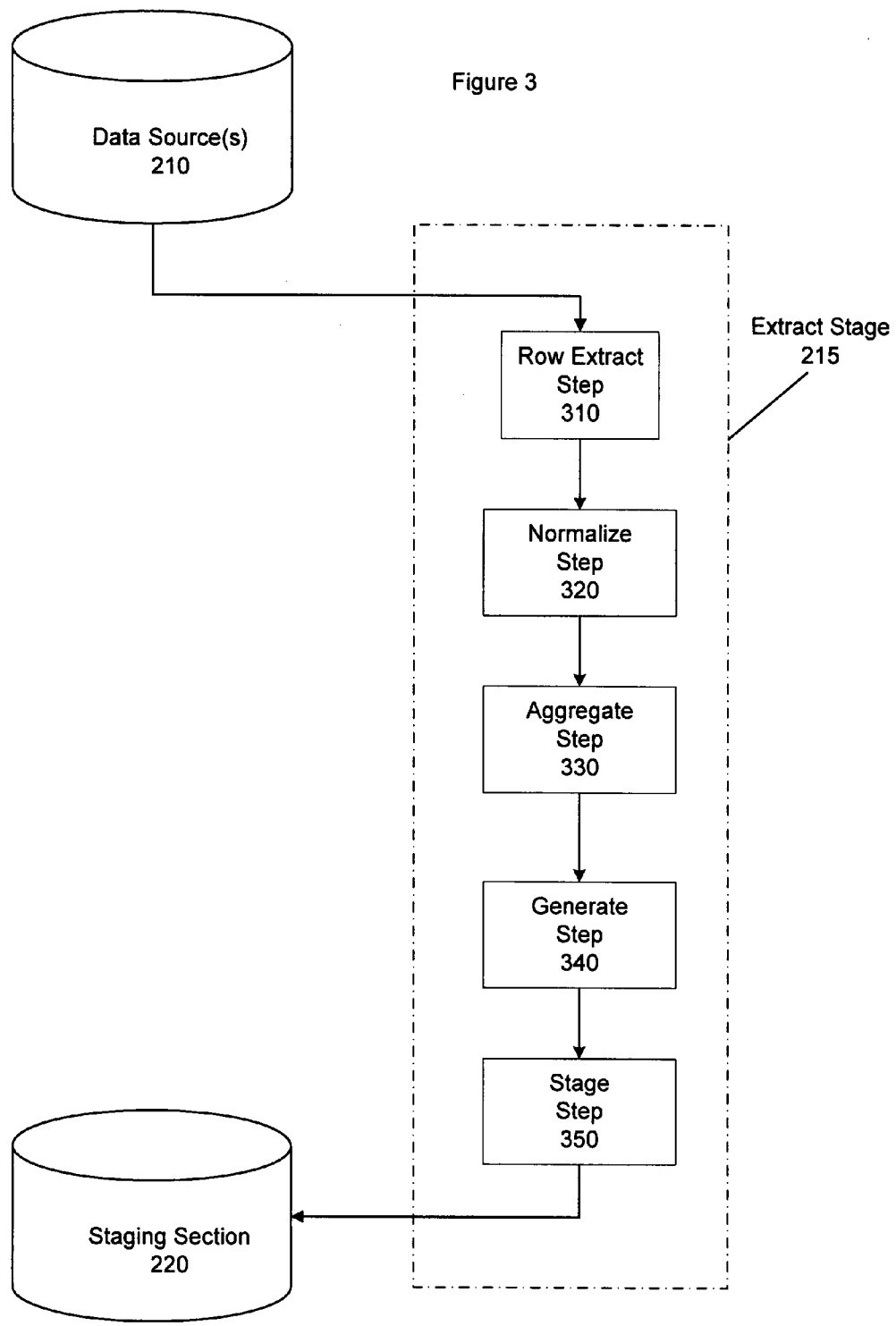
FIG. 3 is a diagrammatic representation of a stage of one embodiment of the present invention.

FIG. 3 depicts a flow diagram for one embodiment of extract stage 215. In the embodiment depicted in FIG. 3, extract stage 215 is implemented in five steps: row extract step 310, normalize step 320, aggregate step 330, generate step 340 and stage step 235. Other implementations are possible. For example, the functionality of aggregate step 330 and generate step 340 may be omitted in implementations of extract stage 215.

At row extract step 310, data is extracted from data source(s) 210 (which may be one or more distinct data sources). This data may be extracted as rows of data. More particularly, in one embodiment, data may be extracted as key/value pairs such that each key has a corresponding value where each key may have one or more corresponding values. In one embodiment of the invention, extracted data can be objects and attributes associated with objects. An object may be a representation of any logical or physical entity. In one embodiment of the invention, extracted rows of data may correspond to objects. Row extract 310 may be performed by an extractor corresponding to a particular type or format of data source. A set of extractors may be provided which can extract data from particular types or formats of data sources. In one embodiment, one or more extractors of row extract step 310 are user-configured such that a user may configure how data is extracted, e.g. in individual key/value pairs. Thus, row extractors may be individually configured. Row extractors may be utilized in a plug-in architecture such that row extractors may be added, removed or configured as desired. For example, to extract data from an XML document, a row extractor may be developed (perhaps using XPATH) and plugged into the plug-in architecture. Thus, in addition to provided extractors, one or more extractors can be developed for one or more data sources.

At normalize step 320, the data extracted in step 310 is normalized. In one embodiment of the invention, normalization of data is independent of how the data is fetched and unrelated to the row extractors used to extract the data. In one embodiment, at normalize step 320, extracted rows of data may be pivoted and sorted into a standard form. In one embodiment of the invention, the standard form is similar to or the same as a data format of the Troux database. In one embodiment of the invention, pivoting is a process in which rows for a given object are merged into a single row with a separate column for each of the object's attributes. Pivoting can be applied per data source or per sets of data from sets of data sources. For example, suppose data is extracted at step 310 from a spreadsheet where each row in the spreadsheet corresponds to an object and each column represents an attribute of the object. In this case, the incoming data is already in a desired normalized form which is the standard form.

As a second example, consider a data source whose format resembles the following:

| ObjectID | Attribute | AttributeValue |
|----------|-----------|----------------|
| Object1  | Attribute1 | Value1 |
| Object1  | Attribute2 | Value2 |
| Object1  | Attribute3 | Value3 |
| Object2  | Attribute1 | Value4 |
| Object2  | Attribute2 | Value5 |
| Object2  | Attribute3 | Value6 |

In this case, each object has its attributes split over a number of rows (one row per attribute). Subsequent to row extract step 310, as per normalize step 320, all rows corresponding to an object may be merged into a single row where each column represents one of the attributes. In one embodiment, normalized data from a data source will look like this:

| ObjectID | Attribute1 | Attribute2 | Attribute3 |
|----------|-----------|-----------|-----------|
| Object1  | Value1    | Value2    | Value3    |
| Object2  | Value4    | Value5    | Value6    |

As a third example, consider a data source that stores data in an array of key/value pairs. The extracted data may look like this:

| ObjectID | ListValues |
|----------|-----------|
| Object1  | Value1 |
| Object1  | Value2 |
| Object1  | Value3 |
| Object2  | Value4 |
| Object2  | Value5 |

In this case, each object has values for an attribute split over a number of rows (one row per attribute). As per normalize step 320, all rows corresponding to an object may be merged into a single row where each column represents one attribute. In one embodiment, normalized data from a data source will look like this:

| ObjectID | ListAttribute |
|----------|---------------|
| Object1  | Value1, Value2, Value3 |
| Object2  | Value4, Value5 |

Thus, prior to step 320, data associated with an object may be comprised by multiple rows of a data source. After normalize step 320, in embodiments of the invention, data associated with an object is normalized such that data associated with an object is contained in a single row.

Normalize step 320 may be implemented by one or more normalization processes or tools corresponding to one or more data sources. In one embodiment, one or more normalization processes or tools are user-configured such that the process by which rows corresponding to a given object are merged into a single row is configured by a user. In further embodiments, normalization processes and tools are implemented in a plug-in architecture such that one or more normalization processes or tools (e.g. computer code) may be added, supplemented or removed as desired. For example, to normalize a set of data having a format not corresponding to existing normalization tools, normalization code may be developed and plugged into the plug-in architecture such that the set of data can be normalized. Thus, in addition to provided normalization processes and tools, one or more normalization processes and tools corresponding to one or more data sources may be developed.

In embodiments of the invention, aggregate step 330 may be subsequent to normalize step 320. At aggregate step 330, one or more sets of rows may be aggregated into one or more single rows. Rows in a set of rows may contain data regarding the same object. Aggregated rows may be from the same data source, from different data sources or from different types of data sources (such as spreadsheets and database tables). After sets of rows have been aggregated, there may be a one to one correspondence between objects and rows. For example, at row extract step 310, a row extractor may extract rows containing list data about objects while a different row extractor may extract rows containing simple data fields about the objects. Subsequent to the normalization of these rows, at aggregate step 330, these rows may be aggregated into rows containing both the list data and the simple data such that there is a one to one correspondence between objects and rows. Thus, after aggregate step 330, there may be a one to one correspondence between objects and rows such that all data corresponding to an object will be contained in a single row.

Aggregate step 330 may be implemented utilizing one or more aggregation processes or tools. Different aggregation processes or tools may correspond to different data sources or sets of data sources. In one embodiment, processes or tools of aggregate step 330 are user-configured such that a user configures the process by which sets of rows corresponding to a single object are aggregated such that all data corresponding to an object will be contained in a single row. In further embodiments, aggregate step 330 is implemented in a plug-in architecture such that processes or tools (e.g. computer code) implementing aggregate step 330 may be added, supplemented or removed as desired. For example, to aggregate rows from one or more data sources, aggregation code may be developed (perhaps using C) and plugged into the plug-in architecture such that rows from the data sources will be aggregated. Thus, in addition to provided processes and tools implementing step 330, processes and tools can be developed based on the set of rows to be aggregated.

In one or more embodiments of the invention, generate step 340 may be subsequent to normalize step 320 or aggregate step 330. At generate step 340, data structures may be generated from normalized or aggregated rows. Each row (which contains information about a single object) can be mapped to a data structure such that all data is represented in a data format of the Troux database. Mapping rows to data structures results in data being contained in data structures which may correspond to data structures in central repository 240.

In one embodiment, generate step 340 may be implemented by mappings delineating the correspondence of columns in a row to properties of a data structure existing in central repository 240. These mappings may be user configured or specified. Embodiments of mappings can define one to one correspondences between columns of rows and properties of data structures in central repository 240. Embodiments of mappings can include scripts (e.g. JavaScripts) that specify how data in rows is to be transformed to create data structures which correspond to data structures in central repository 240, or mappers which map data in rows to data structures. Embodiments of the invention may use additional processes or tools to generate data structures. A set of scripts or mappers may be provided which can be used to generate data structures. In further embodiments, generate step 340 is implemented in a plug-in architecture such that processes or tools (e.g. mappers, scripts, computer code) implementing generate step 340 may be added, supplemented or removed as desired. For example, a script may be developed to concatenate three columns representing first name, middle name, and last name in order to produce a single full name property which mirrors a property of a data structure in central repository 240. The script could be plugged into the plug-in architecture and used to generate data structures.

Data structures generated at generate step 340 may be expressed in any file or program protocol or standard. In one embodiment of the invention, at generate step 340, columns of rows are mapped to XML elements representing properties. In this embodiment, an XML file that contains the current state of the data contained in the data sources may be produced. In further embodiments, data structures are expressed in a program protocol of the Troux database.

At stage step 350, the data structures produced at generate step 340 may be loaded into staging section 220. At this juncture, data structures corresponding to data structures in central repository 240 have been developed from data extracted from the data source(s) and stored or otherwise recorded. In one embodiment of the invention, staging section 220 is contained in or associated with the Troux database. In a further embodiment of the invention, data extracted from each data source is contained in a corresponding section in staging section 220.

Transform Stage

Turning back to FIG. 2, at transform stage 225, data in staging section 220 is correlated with data in central repository 240. Data in staging section 220 is compared against data in central repository 240 and the changes to be applied to the data in central repository 240 are determined. At transform stage 225, a set of data operations to be performed on central repository 240 are developed. In one embodiment of the invention, data operations may be utilized to add data to central repository 240 or to modify data existing in central repository 240. The set of data operations may be stored in a load section 230. In some embodiments of the invention, because central repository 240 is contained in the Troux database, correlation may be more efficient if staging section 220 is also contained in the Troux database. At transform stage 225, data conflicts and data redundancy may be resolved.

In one embodiment of the invention, processes and tools implementing transform stage 225 can be supplemented. For example, it may be desirable to create new data structures from existing data structures. To this end, tools can be developed (e.g. subroutines) which instantiate new data structures in staging section 220 representing properties of data structures contained in staging section 220. For example, in a staging section which contains data structures representing computers, each data structure may have a property that holds the name of its data center. It may be desired to store the data center not as a property but rather as a separate component. Code can be developed which detects that a computer component exists in staging section 220, adds a new component representing the data center property and adds a new relationship associating the computer component with the data center component.

Figure 4:
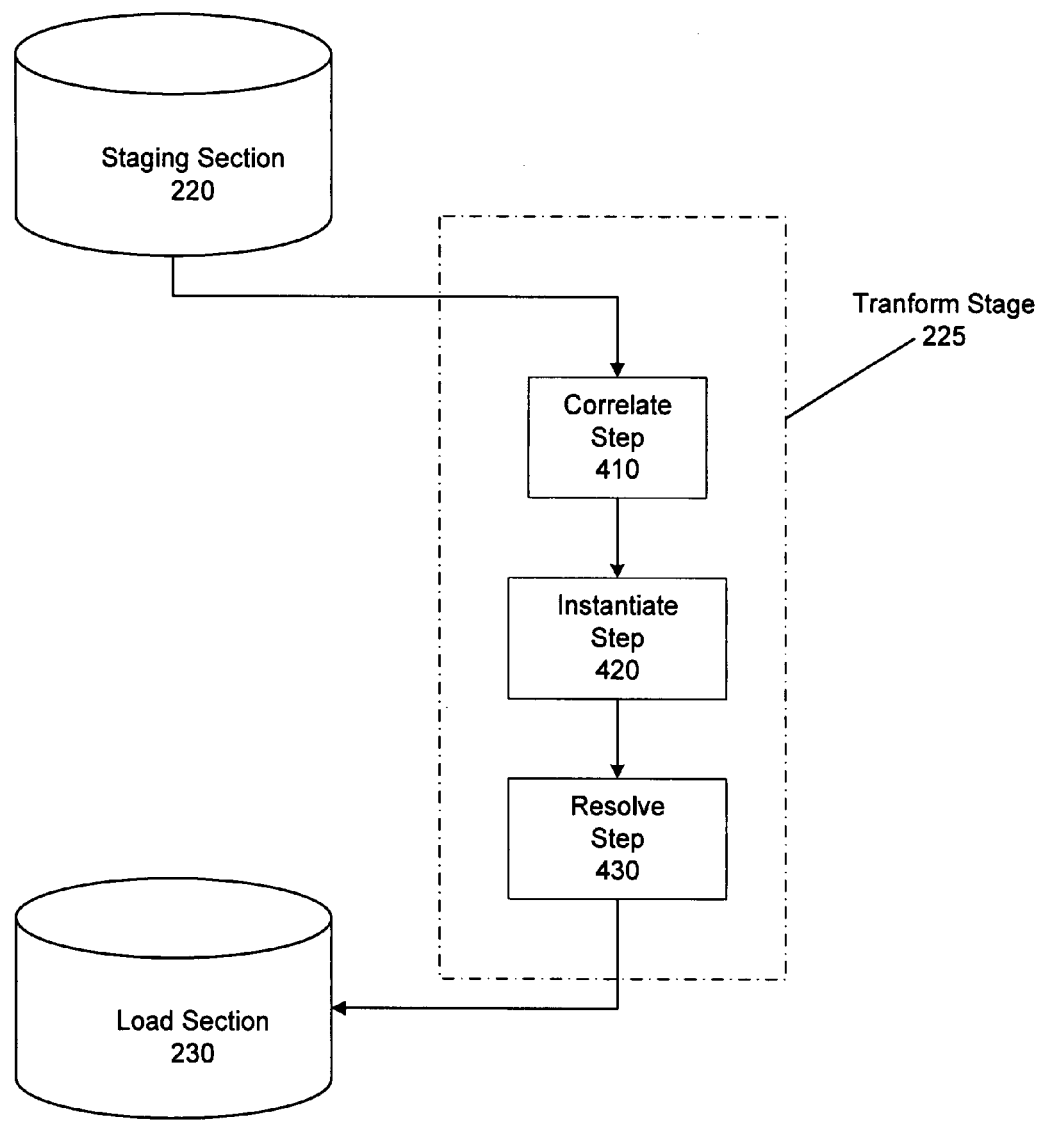
FIG. 4 is a diagrammatic representation of a stage of one embodiment of the present invention.

Attention is directed to FIG. 4. FIG. 4 depicts a flow diagram for one embodiment of an implementation of transform stage 225. In this embodiment, data operations to be applied to central repository 240 are developed and then recorded in load section 230. In the embodiment depicted in FIG. 4, transform stage 225 is implemented in three steps: correlate step 410, instantiate step 420 and resolve step 430. Other implementations are possible.

At correlate step 410, data structures in staging section 220 may be correlated with data structures in central repository 240 such that data of corresponding properties of corresponding data structures can be compared. In one embodiment of the invention, correlation between data structures can be achieved utilizing one or more query language statements. In the context of the Troux database, the rules used to correlate data structures in staging section 220 to data structures in central repository 240 are configurable and possibly different for each data source. The rules used to correlate data structures can be dependant on the type of data structure or can be hierarchical. The rules used to correlate data structures can be based on different properties of a data structure. In embodiments of the invention, a combination of the above can be used to establish correlation and other means of correlation as would be known to one skilled in the art are encompassed by the invention. As an example, correlation may be made between two data structures of the same type.

In one embodiment of the invention, at correlate step 410, an association between correlated data structures can be created, data in the correlated data structures can be augmented or data structures may be modified by adding new properties and/or data to a data structure (e.g. by adding an identifier to data structures which previously did not have an identifier). In one embodiment of the invention, one or more data structures in staging section 220 are augmented or modified.

For example, several data sources may contain data regarding computers. The first data source may track computers by company-assigned asset tags, the second data source may track computers by IP address, and the third data source may track computers by name. At correlate step 410, asset tags may be used to correlate data structures representing computers from the first data source to data structures in central repository 240, IP addresses may be used to correlate data structures representing computers from the second data source and names may be used to correlate data structures representing computers from the third data source. Note that even though the data sources use different properties to track data structures, there may be intersections in the computers tracked by the different data sources. At correlate step 410, these intersections may be identified. At correlate step 410, asset tags may be added to one or more data structures contained in staging section 220 which represent computers from the second or third data sources. Thus, data structures in staging section 220 representing computers from the second or third data source can thereafter be identified by asset tags.

Subsequent to correlate step 410, at instantiate step 420, data structures or properties to be instantiated in central repository 240 may be determined. Add data operations for these data structures or properties may be recorded. In one embodiment, these operations can be recorded in load section 230. For example, data structures in the staging section 220 that could not be correlated with corresponding data structures in central repository 240 can represent new components or relationships. Add data operations for these data structures may be recorded in load section 230. As a further example, in one embodiment, properties of data structures in staging section 220 that could not be correlated with corresponding properties of corresponding data structures in central repository 240 can be new properties. Add data operations for these properties may be recorded in load section 230.

Subsequent to correlate step 410, at resolve step 430, data conflicts between data source(s) and central repository 240 are resolved. Data structures in staging section 220 are compared with correlating data structures in central repository 240. In one embodiment, data structures in staging section 220 which have the same values as correlating data structures in central repository 240 are ignored or deleted from staging section 220. Precedence between data in central repository 240 and conflicting data in staging section 220 may be determined. Resolve step 430 can be configured with precedence rules such that data sources have precedence relative to each other when conflicts occur. Precedence rules can be configured on a per property basis. Precedence can vary based upon time or other factors. A user (virtual or otherwise) or a data source may have an associated precedence based upon the definitiveness of the user or data source such that data from users or data sources has a clearly established precedence hierarchy. This precedence hierarchy can be used to determine the data operations to be applied to central repository 240. These data operations may be recorded in load section 230.

For example, if data in staging section 220 conflicts with correlating data in central repository 240, and if the data source associated with the data in staging section 220 has lower precedence in a precedence hierarchy than the data source that last changed the correlating data in central repository 240, then the data or data structure in staging section 220 has insufficient precedence and is ignored or deleted. However, if the data source associated with the data in staging section 220 has higher precedence in the precedence hierarchy, a data change operation will be recorded in load section 230.

As another example, a data source may have a definitive list of computers. If central repository 240 has extra computer components that are not present in the definitive data source, those extra computer components should be deleted. A query can locate computer components in central repository 240 which are not present in the definitive data source. If such computer components are found, delete data operations regarding said computer components can be recorded in load section 230. Precedence rules can be user-configured. As would be apparent to one of ordinary skill in the art, precedence rules can be implemented in any number of ways by embodiments of the invention.

Embodiments of resolve step 430 can include an iterative process which compares corresponding data structures associated with different data sources. Data structures associated with different data sources can be contained in separate sections of staging section 220. In one embodiment, corresponding data structures contained in different sections are compared. In a further embodiment, corresponding properties of corresponding data structures contained in different sections are compared. More particularly, data structures and properties in one section of staging section 220 can be compared to corresponding data structures and properties in another section of staging section 220 such that a set of data structures may be complied in accordance with a hierarchy of precedents. The set of data structures can be compared against data in central repository 240. Based upon the comparison, data operations to be applied to central repository 240 may be recorded in load section 230.

In another embodiment, data in each different section is directly compared against data in central repository 240. Based on precedence rules, data operations to be applied to central repository 240 can be recorded in load section 230. As would be understood by one skilled in the art, other methods of developing a set of data operations to be applied to central repository 240 using precedences can be used. For example, data (which may be redundant data or data which is the same as data in central repository 240) can be culled from staging section 220 using methods described above such that the data which will be used to update central repository 240 is contained staging section 220.

In one embodiment of the invention, data, properties or data structures can be removed from central repository 240 through the use of touch logs. A data structure or property may have an associated touch log. If data, a property or a data structure is encountered by a user or contained in a data source, the touch log will be marked. If data, a property or a data structure is not encountered by a user or contained in a data source, the touch log will be not be marked. If insufficient touches are logged on the touch log or if the data, property or data structure has not been encountered for a specified time, the data, property or data structure may be presumed not to exist and a delete operation for the data, property or data structure may be recorded in load section 230. As would be understood by one skilled in the art, precedence and precedence rules can be used with touch logs. For example, if a definitive user (virtual or otherwise) is not logged in the touch log of a component, a delete operation may be recorded in load section 230 regarding the corresponding data structure in central repository 240.

While in the particular embodiment of transform stage 225 shown in FIG. 4, resolve step 430 follows instantiate step 420, this is by way of example, not limitation: data structures and properties can be instantiated after data conflicts and redundancies have been resolved or both steps may be carried out substantially concurrently. Some embodiments of the present invention may not have instantiate functionality.

Load Stage

Turning back to FIG. 2, subsequent to transform stage 225, at load stage 235, central repository 240 may be updated. Central repository 240 may be updated by the propagation of data into central repository 240. In one embodiment, load section 230 is read and data operations recorded in load section 230 are applied to central repository 240. In one embodiment of the invention, load section 230 is contained in a database containing central repository 240. In a further embodiment of the invention, load section 230 is part of staging section 220.

In one embodiment of the invention, data operations are applied to central repository 240 at load stage 235 because in steady-state, only a percentage of the data in staging section 220 may differ from the data in central repository 240. That is, because only a small percentage of data in a data source may change, the changes to be propagated into central repository 240 may be a relatively small percentage of the data in one or more data sources. For example, if 100,000 rows are extracted to staging section, it is not uncommon for transform stage 225 and load stage 235 to propagate only a few hundred changes into central repository 240. Analyzing 100,000 rows to determine what has changed is computationally expensive. Thus, the implementation of transform stage 225 may take a relatively long time. By contrast, propagating the resulting few hundred changes into central repository 240 may be relatively fast. Accordingly, load stage 235 may take seconds or less.

Thus, if changes were propagated directly into central repository 240 at transform stage 225, changes could trickle into central repository 240 over a period of several hours. During that period, data in central repository 240 would be in flux and users would be using data of uncertain validity. That is, part of the data would be new data that had trickled in, and part would be old data. Users might not work with consistent data for a period of several hours. However, in some embodiments of the invention, because data operations to be applied to central repository 240 are recorded in load section 230 at transform stage 225, at load stage 235, the recorded data operations can be executed to propagate changes into central repository 240 such that the repository is quickly updated. Thus, the time data in central repository 240 is in flux may be greatly reduced, from as much as several hours to several seconds.

Batching

Embodiments of the invention may issue large query statements against central repository 240 that have the potential to consume the computational resources of central repository 240 and systems running central repository 240 for periods of time. In particular, other users or systems may not be able to operate in central repository 240 or systems running central repository 240 while a database language statement (e.g. a query) is processed. As a result, other users of central repository 240 or the system running central repository 240 may experience poor performance.

To mitigate these effects, embodiments of the invention can be implemented using a process called batching. In batching, the data to be processed is subdivided into batches such that instead of one large batch of data being processed, many smaller batches of data are processed. For example, instead of processing 100,000 data structures in a single query, the 100,000 data structures might be processed using a set of queries, each query processing 1,000 data structures. This allows individual queries to run quickly so that a user may operate in central repository 240 without lengthy delays.

FIG. 5 illustrates one embodiment of how a user request may be processed without batching. As shown in FIG. 5, a query arrives at a system running central repository 240 at time(510) and processing of the query begins. Subsequent to time(510), at time(520), a user request arrives at the system running central repository 240. Because batching is not used, processing the user request is delayed until the query has processed a complete set of data to be processed. At time(530) the processing of the query is completed. Subsequent to time (530), at time(540), the user request is processed. Thus, the duration of the delay in processing the user request is the time period between time(520) and time(530). The duration of the delay between time(520) and time(530) will depend on the amount of data being processed: the greater the amount of data, the longer processing the user request is delayed. Thus a user operating in a system shown in FIG. 5 may encounter delays corresponding to the amount of data in the complete set of data to be processed. Depending on the amount of data in the complete set of data to be processed, these delays may be lengthy.

FIG. 6 illustrates one embodiment of how an embodiment of batching mitigates the possibility of lengthy delays. The complete set of data to be processed by a query or other database language statement may be broken up into several smaller batches (i.e. batch 1, batch 2, batch 3 and batch 4). The amount of time required to process a batch can be less than the amount of time required to process the complete set of data to be processed. A user request can be processed between batches, reducing the time the user request is delayed. In FIG. 6, the complete set of data to be processed is divided into four batches: batch 1, batch 2, batch 3 and batch 4.

As shown in FIG. 6, batch 1 query arrives at a system running central repository 240 at time(610) and processing of batch 1 query begins. Subsequent to time(610), at time(620), a user request arrives at the system running central repository 240. Because batching is used, processing the user request is delayed until batch 1 query has processed the data in batch 1. The amount of data in batch 1 is less than a complete set of data to be processed. At time(630) the processing of the query is completed. Subsequent to time(630), at time(640), the user request is processed. Thus, the duration of the delay in processing the user request is the time period between time(620) and time(630). The duration of the delay between time(620) and time(630) will depend on the amount of data in batch 1. Thus, in embodiments of the invention utilizing batching, the delays a user operating in the system running central repository 240 encounters may not directly correspond to the amount of data in the complete set of data to be processed.

In one embodiment of the invention, batch sizes are configurable. To maximize processing data at the expense of processing user requests, the batch size can be set very large. Alternatively, to maximize processing user requests at the expense of processing data, the batch size can be set very small. The batch size can be set to any size to yield the requisite balance of processing data and processing user requests. Batch sizes may be user-configurable such that a user such as a network administrator or other user may set batch size. Batch sizes may be set by a computer program. Batch sizes may be automatically configured and dynamically configured. For example, if few users were using central repository 240, the batch size might be set very large, but if the system running central repository 240 detected several users issuing commands to central repository 240, the batch size might be dynamically reduced such that the users would have their user requests processed in appropriate time.

In one embodiment, each stage and step of the invention is implemented using plug-in architecture such that processes and tools can be supplements with additional processes and tools. This allows users to add processes and tools.

Embodiments of the present invention can be embodied in software code as either a stand-alone program or as part of a larger program. Embodiments of the present invention can be implemented using databases other than the Troux database. Embodiments of the present invention may be implemented using a variety of data repositories which do not have to exist within the confines of a traditional database. Functions and processes of the present invention can occur in the same or different computers. For example, some stages of the invention may be implemented in a server while others may be implemented in a client computer. Persons skilled in the art will understand that the stages and steps delineated above may be carried out in different sequences without departing from the scope of the invention. Different computer languages, database languages or other languages may be used with different embodiments, stages and steps of the invention.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method of extracting data from one or more data sources to a central repository storing a data model, the data model comprising a set of components and relationships representing entities in an environment and the relationships between these entities, wherein each of the components and relationships in the data model has a type and a set of properties and the values for the type and set of properties of each of the components and relationships in the data model are based on a first set of data extracted at a first time from each of the one or more data sources, comprising:

extracting a second set of data from the one or more data sources at a second time subsequent to the first time;
    normalizing and mapping the second set of data into a format associated with the data model in the central repository;
    correlating the second set of data extracted at the second time with the components and relationships of the data model stored in the central repository;
    comparing the components and relationships of the data model in the central repository with the second set of data; and
    updating the data model in the central repository based on the comparison of the components and relationships of the data model, wherein updating the data model comprises
        determining a set of operations to update the data central repository, wherein the set of operations is based on the comparison between the second set of data and the component and relationships in the central repository and the set of operations are configured to alter the types of values of the components or relationships in the central repository or to add components or relationships to the central repository to account for changes in the one or more data sources associated with the components or relationships which occurred between the first time and the second time, and
    applying the set of operations to the central repository to update the data model.

2. The method of claim 1, wherein the first set of data is associated with a first set of precedences, the second set of data is associated with a second set of precedences and determining a set of operations to be applied to the second set of data is based on the first set of precedences, the second set of precedences and precedence rules.

3. The method of claim 2, further comprising updating the second set of precedences based on the first set of precedences and the set of operations.

4. The method of claim 1, further comprising generating a first set of data structures from the second set of data.

5. The method of claim 4, wherein comparing the components and relationships of the data model in the central repository with the second set of data comprises correlating the first set of data structures with a second set of data structures associated with the data model.

6. The method of claim 1, wherein normalizing and mapping the second set of data comprises producing an XML file containing the current state of the second set of data.

7. The method of claim 1, further comprising dividing the second set of data into a plurality of batches, wherein the second set of data is compared according to the plurality of batches.

8. A non-transitory computer readable medium comprising instructions for extracting data from one or more data sources to a central repository storing a data model, the data model comprising a set of components and relationships representing entities in an environment and the relationships between these entities, wherein each of the components and relationships in the data model has a type and a set of properties and the values for the type and set of properties of each of the components and relationships in the data model are based on a first set of data extracted at a first time from each of the one or more data sources, the instruction including instructions for:

extracting a second set of data from the one or more data sources at a second time subsequent to the first time;
    normalizing and mapping the second set of data into a format associated with the data model in the central repository;
    correlating the second set of data extracted at the second time with the components and relationships of the data model stored in the central repository;
    comparing the components and relationships of the data model in the central repository with the second set of data; and
    updating the data model in the central repository based on the comparison of the components and relationships of the data model, wherein updating the data model comprises
        determining a set of operations to update the data central repository, wherein the set of operations is based on the comparison between the second set of data and the component and relationships in the central repository and the set of operations are configured to alter the types of values of the components or relationships in the central repository or to add components or relationships to the central repository to account for changes in the one or more data sources associated with the components or relationships which occurred between the first time and the second time, and applying the set of operations to the central repository to update the data model.

9. The computer readable medium of claim 8, wherein the first set of data is associated with a first set of precedences, the second set of data is associated with a second set of precedences and determining a set of operations to be applied to the second set of data is based on the first set of precedences, the second set of precedences and precedence rules.

10. The computer readable medium of claim 9, further comprising updating the second set of precedences based on the first set of precedences and the set of operations.

11. The computer readable medium of claim 8, further comprising generating a first set of data structures from the second set of data.

12. The computer readable medium of claim 11, wherein comparing the components and relationships of the data model in the central repository with the second set of data comprises correlating the first set of data structures with a second set of data structures associated with the data model.

13. The computer readable medium of claim 8, wherein normalizing and mapping the second set of data comprises producing an XML file containing the current state of the second set of data.

14. The computer readable medium of claim 8, further comprising dividing the second set of data into a plurality of batches, wherein the second set of data is compared according to the plurality of batches.

15. A system, including one or more data sources;

a central repository coupled to the one or more data sources, the central repository storing a data model, the data model comprising a set of components and relationships representing entities in an environment and the relationships between these entities, wherein each of the components and relationships in the data model has a type and a set of properties and the values for the type and set of properties of each of the components and relationships in the data model are based on a first set of data extracted at a first time from each of the one or more data sources; and a non-transitory computer readable medium, including instructions for extracting data from the one or more data sources to the central repository, the instruction including instructions for:

extracting a second set of data from the one or more data sources at a second time subsequent to the first time;

normalizing and mapping the second set of data into a format associated with the data model in the central repository;

correlating the second set of data extracted at the second time with the components and relationships of the data model stored in the central repository;

comparing the components and relationships of the data model in the central repository with the second set of data; and updating the data model in the central repository based on the comparison of the components and relationships of the data model, wherein updating the data model comprises determining a set of operations to update the data central repository, wherein the set of operations is based on the comparison between the second set of data and the component and relationships in the central repository and the set of operations are configured to alter the types of values of the components or relationships in the central repository or to add components or relationships to the central repository to account for changes in the one or more data sources associated with the components or relationships which occurred between the first time and the second time, and applying the set of operations to the central repository to update the data model.

16. The system of claim 15, wherein the first set of data is associated with a first set of precedences, the second set of data is associated with a second set of precedences and determining a set of operations to be applied to the second set of data is based on the first set of precedences, the second set of precedences and precedence rules.

17. The system of claim 16, further comprising updating the second set of precedences based on the first set of precedences and the set of operations.

18. The system of claim 15, further comprising generating a first set of data structures from the second set of data.

19. The system of claim 18, wherein comparing the components and relationships of the data model in the central repository with the second set of data comprises correlating the first set of data structures with a second set of data structures associated with the data model.

20. The system of claim 15, wherein normalizing and mapping the second set of data comprises producing an XML file containing the current state of the second set of data.

21. The system of claim 15, further comprising dividing the second set of data into a plurality of batches, wherein the second set of data is compared according to the plurality of batches.

* * * * *